(12) United States Patent
Yoshihara et al.

(10) Patent No.: US 11,408,388 B2
(45) Date of Patent: Aug. 9, 2022

(54) VEHICULAR CONTROL APPARATUS

(71) Applicant: DENSO CORPORATION, Kariya (JP)

(72) Inventors: Daiki Yoshihara, Kariya (JP); Takashi Hashizume, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/227,985

(22) Filed: Apr. 12, 2021

(65) Prior Publication Data

US 2021/0231091 A1 Jul. 29, 2021

Related U.S. Application Data

(63) Continuation of application No. PCT/JP2019/047209, filed on Dec. 3, 2019.

(30) Foreign Application Priority Data

Dec. 26, 2018 (JP) .............................. JP2018-242744

(51) Int. Cl.
*F02N 11/08* (2006.01)
*B60R 16/03* (2006.01)

(52) U.S. Cl.
CPC .......... *F02N 11/0862* (2013.01); *B60R 16/03* (2013.01)

(58) Field of Classification Search
CPC .............................. F02N 11/0862; B60R 16/03

USPC ................................................ 307/10.6, 10.1
See application file for complete search history.

(56) References Cited

U.S. PATENT DOCUMENTS

| 9,798,307 B2* | 10/2017 | Zhang ................... B60W 10/30 |
| 2016/0011576 A1 | 1/2016 | Takeda et al. |
| 2019/0143968 A1* | 5/2019 | Song ................ B60W 60/0015 |
| | | 701/301 |

FOREIGN PATENT DOCUMENTS

| JP | 2009159121 A | 7/2009 |
| JP | 2010180776 A | 8/2010 |
| JP | 2012120255 A | 6/2012 |
| JP | 2014197370 A | 10/2014 |
| JP | 6036578 B2 | 11/2016 |

* cited by examiner

*Primary Examiner* — Michael R. Fin
(74) *Attorney, Agent, or Firm* — Harness, Dickey & Pierce, P.L.C.

(57) ABSTRACT

In a vehicular control apparatus, a minimum operating voltage of a first characteristic device is set to be lower than a minimum operating voltage of a second characteristic device. A supply voltage controller is provided between a controller and the second characteristic device to prevent an occurrence of a situation where a supply voltage of a device power supplied to the second characteristic device becomes less than an input voltage of a signal line of a control signal transmitted from the controller to the second characteristic device.

5 Claims, 9 Drawing Sheets

FIG. 6 COMPARATIVE

VEHICULAR CONTROL APPARATUS

CROSS REFERENCE TO RELATED APPLICATIONS

The present application is a continuation application of International Patent Application No. PCT/JP2019/047209 filed on Dec. 3, 2019, which designated the U.S. and claims the benefit of priority from Japanese Patent Application No. 2018-242744 filed on Dec. 26, 2018. The entire disclosures of all of the above applications are incorporated herein by reference.

TECHNICAL FIELD

The present disclosure relates to a vehicular control apparatus.

BACKGROUND

For example, a vehicle such as an automobile is equipped with a vehicular control apparatus that integrally controls a plurality of functions having different characteristics. Such a vehicular control apparatus may have a configuration which includes (i) a first characteristic device that provides the function of a first characteristic, (ii) a second characteristic device that provides the function of a second characteristic, and (iii) a microcomputer that controls the function of the first characteristic and the function of the second characteristic. Further, in such a configuration, the function of the first characteristic may be a function that requires operation guarantee at low voltage, and the function of the second characteristic may be a function that does not require operation guarantee at low voltage. In such a case, the microcomputer and the first characteristic device may be operated by a first power that provides the operation guarantee at the low voltage, whereas the second characteristic device may be operated by a second power that does not provide the operation guarantee at the low voltage. The first characteristic device may be a safety and security device that provides a safety and security function that requires safety and security rather than convenience and comfort. The second characteristic device may be a multimedia device that provides a multimedia function that does not require as much safety and security as the safety and security function.

Start operation for starting the engine of the vehicle needs high electric power; this involves a momentary interruption which reduces temporarily the power voltage supplied to the vehicular control apparatus from the outside. The above configuration in which the microcomputer controls a plurality of types of functions having different power restrictions needs to continue some functions even if a momentary interruption occurs. For example, suppose a case where the power voltage drops from 10 V or higher to 4 V. Under such a case, at 10 V or higher both the safety and security function and the multimedia function are operated normally, whereas at 4 V, the multimedia function needs to be stopped, but the safety and security function needs to be continued.

SUMMARY

According to an example of the present disclosure, a vehicular control apparatus is provided as follows. In the vehicular control apparatus, a minimum operating voltage of a first characteristic device is set to be lower than a minimum operating voltage of a second characteristic device. A supply voltage controller is provided between a controller and the second characteristic device to prevent an occurrence of a situation where a supply voltage of a device power supplied to the second characteristic device becomes less than an input voltage of a signal line of a control signal transmitted from the controller to the second characteristic device.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

First Embodiment

Hereinafter, a first embodiment will be described with reference to FIGS. 1 to 6. A vehicular control apparatus is used in an in-vehicle cockpit system. The cockpit system aggregates (i) information on safety and security functions such as meter information and (ii) information on multimedia functions such as map information and audio information, in a vehicular control apparatus. The cockpit system gives priority to the various information to display it in a timely manner to prevent the driver from overlooking important information. Since the cockpit system has a configuration in which the vehicular control apparatus collectively manages the input information and the output information, the input source and the output destination of various information can be freely rearranged. The input information is, for example, vehicle information such as vehicle speed and mileage, digital TV image information, smartphone cooperation information linked with a smartphone, and the like. The output information includes (i) screen images drawn on the meter MID screen arranged in the center of the meter and the center display screen installed in the center of the dashboard of the vehicle, and (ii) the sound corresponding to the screen image.

Figure 1:
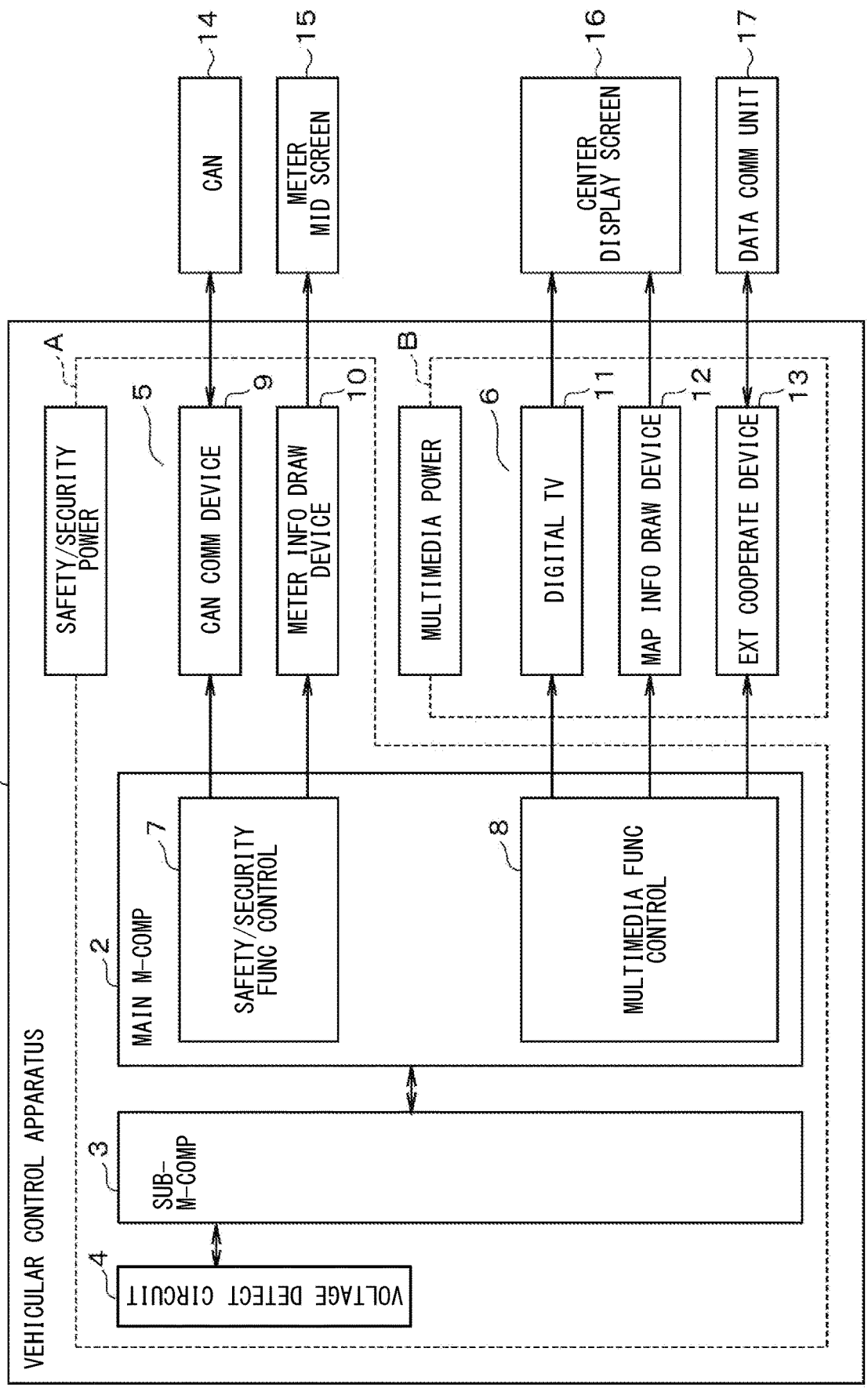
FIG. 1 is a functional block diagram showing a vehicular control apparatus and a peripheral configuration according to a first embodiment.

As shown in FIG. 1, the vehicular control apparatus 1 includes (i) a main microcomputer 2 (hereinafter referred to as a first controller 2), (ii) a sub-microcomputer 3 (hereinafter referred to as a second controller 3), (iii) a voltage detector circuit 4, (iv) a safety and security device 5 (i.e., a first characteristic device), and (iv) a multimedia device 6 (i.e., a second characteristic device). As an example of the first embodiment, each of the main microcomputer 2 (i.e., the first controller 2) and the sub-microcomputer 3 (I.e., the second controller 2) may be provided as a computer including a CPU, memories such as a ROM, a RAM, and I/O interfaces; the memories may store a program product having instructions executed by the CPU.

In vehicles, for example, in-vehicle devices for safety and security such as meters have legal operating standards. The safety and security function is designed to require operation guarantee at low voltage so that it can operate even if the power voltage supplied from the vehicle battery drops. On the other hand, in vehicles, for example, in-vehicle devices for multimedia such as audio device do not have as strict legal operating standards as meters. The multimedia function is designed so that it does not require operation guarantee at low voltage. Under these circumstances, the vehicular control apparatus 1 includes (i) a functional block (functional block indicated by the broken line A in FIG. 1) operated by a safety and security power, which is a power for safety and security and requires low-voltage operation and (ii) a functional block (functional block indicated by broken line B in FIG. 1) operated by a multimedia power, which is a power for multimedia and does not require low-voltage operation. The main microcomputer 2, the sub-microcomputer 3, the voltage detector circuit 4, and the safety and security device 5 operate at the power voltage supplied from the safety and security power. The multimedia device 6 operates at the power voltage supplied from the multimedia power. That is, the minimum operating voltage of the safety and security device 5 is set lower than the minimum operating voltage of the multimedia device 6.

The main microcomputer 2 includes a safety and security function controller 7 and a multimedia function controller 8. The safety and security function controller 7 outputs a control signal to the safety and security device 5 to control the operation of the safety and security device 5. The multimedia function controller 8 outputs a control signal to the multimedia device 6 to control the operation of the multimedia device 6.

The safety and security device 5 includes, for example, a CAN (Controller Area Network) (registered trademark) communication device 9 and a meter information drawing device 10. The CAN communication device operates based on a control signal input from the safety and security function controller 7, and transmits and receives vehicle information to and from the CAN 14. The meter information drawing device 10 operates based on a control signal input from the safety and security function controller 7, outputs a video signal to the meter MID screen 15, and draws a video of the meter information on the meter MID screen 15. The safety and security device 5 may be a device that provides functions other than the communication device 9 and the meter information drawing device 10.

The multimedia device 6 includes, for example, a digital television 11, a map information drawing device 12, and an external cooperation device 13. The digital television 11 operates based on the control signal input from the multimedia function controller 8, outputs the video signal to the center display screen 16, and draws the video of the digital television 11 on the center display screen 16. The map information drawing device 12 operates based on the control signal input from the multimedia function controller 8, outputs the video signal to the center display screen 16, and draws the map information video on the center display screen 16. The external cooperation device 13 operates based on the control signal input from the multimedia function controller 8, and communicates data linked with an external device such as a smartphone, with the data communication unit 17. The multimedia device 6 may be a device that provides functions other than the digital television 11, the map information drawing device 12, and the external cooperation device 13.

Figure 2:
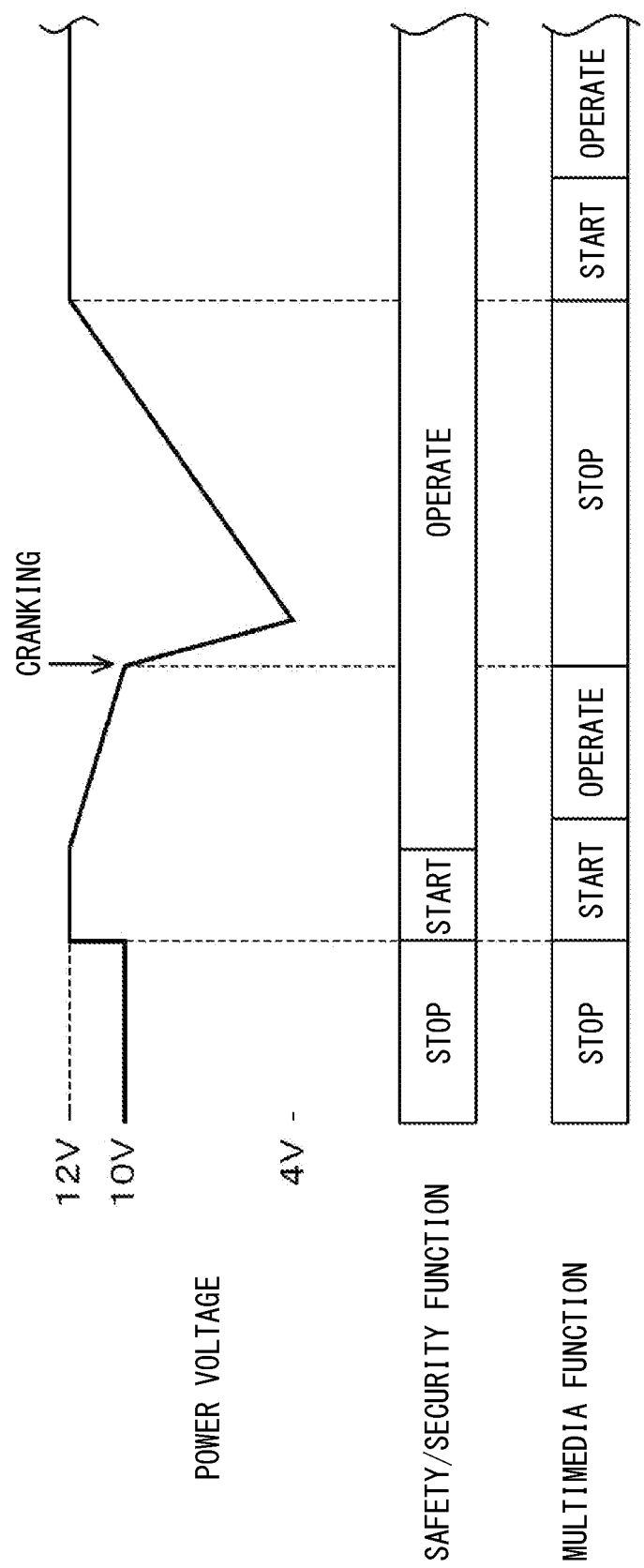
FIG. 2 is a diagram showing a transition of the power voltage and a transition of the function stop.

As explained in BACKGROUND above, high electric power is required at starting operation for starting the engine of the vehicle; thus, a momentary interruption occurs in which the power voltage supplied to the vehicular control apparatus 1 from the outside temporarily drops. In the above configuration, as shown in FIG. 2, for example, under the state where both the safety and security function and the multimedia function are operating normally at 10 V or higher (for example, 12 V), if the power voltage drops from 10 V or higher to 4 V, the multimedia function is stopped, but the safety and security function needs to be continued. In this case, in the multimedia device 6, if the device power is stopped before the input of the control signal from the main microcomputer 2 is stopped, the voltage is applied to the signal line in a state where the device power is not supplied. As a result, the supply voltage of the device power may be lower than the input voltage of the signal line, and there is a concern that the device may be destroyed.

Figure 3:
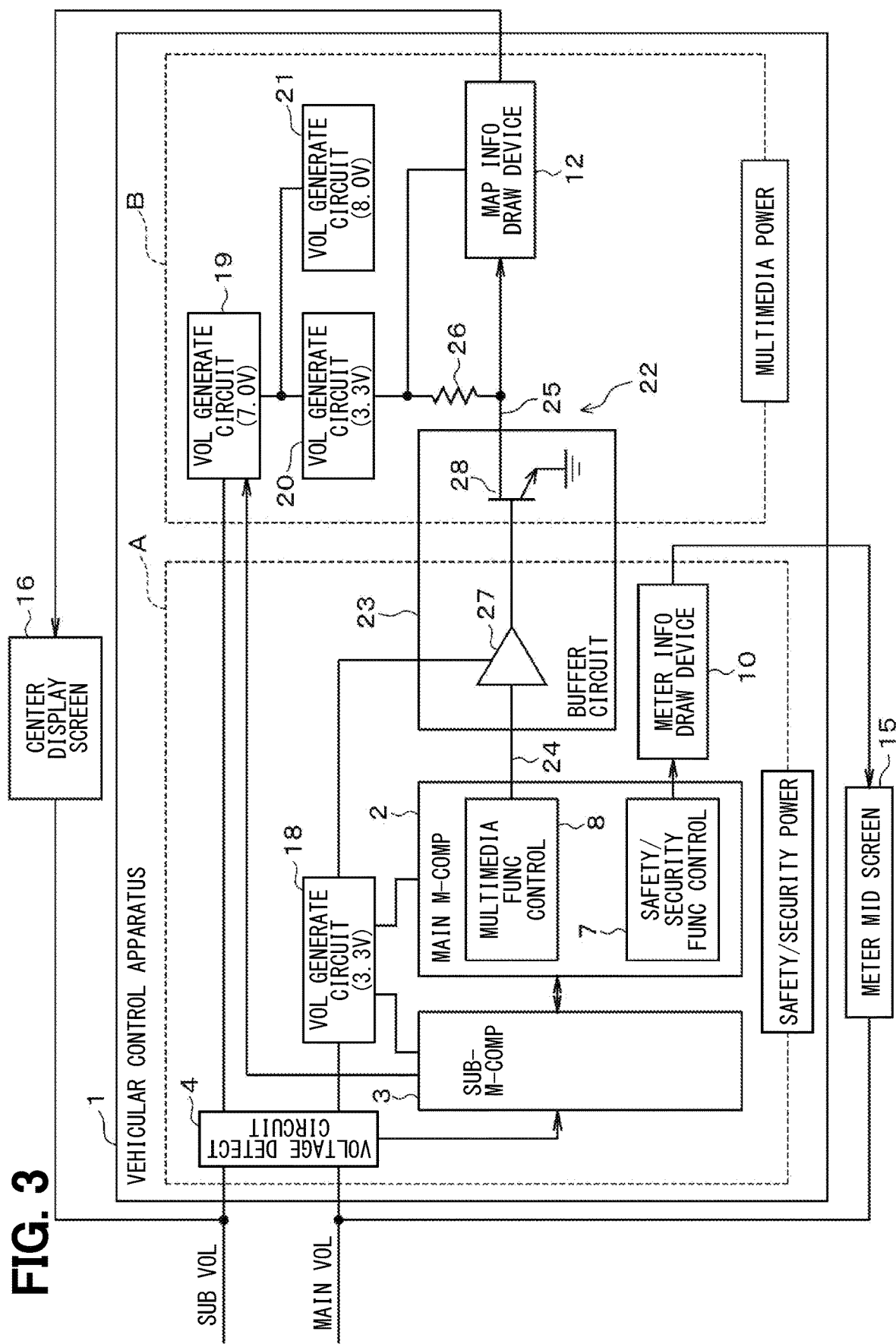
FIG. 3 is a functional block diagram showing a main part.

Under these circumstances, in the present embodiment, in order to avoid the occurrence of a situation in which the input voltage of the signal line exceeds the supply voltage of the device power, the configuration shown in FIG. 3 is adopted between the main microcomputer 2 and the multimedia device 6. In FIG. 3, the map information drawing device 12 will be described as the multimedia device 6, but the same applies to the digital television 11.

In the functional block of the safety and security power, the voltage generation circuit 18 generates a power voltage of 3.3 V from the main voltage supplied from the vehicle battery via the voltage detector circuit 4, and supplies the generated 3.3 V power voltage to the main microcomputer 2, the sub-microcomputer 3, and the buffer circuit 23 described later. In the functional block of the multimedia power, the voltage generation circuit 19 generates a power voltage of 7.0 V from the sub voltage supplied from the vehicle battery via the voltage detector circuit 4, and supplies the generated power voltage of 7.0 V to the voltage generation circuits 20 and 21. The voltage generation circuit 20 generates a power voltage of 3.3 V from the power voltage of 7.0 V supplied from the voltage generation circuit 19, and supplies the generated power voltage of 3.3 V to the map information drawing device 12. The voltage generation circuit 21 generates a power voltage of 8.0 V from the power voltage of 7.0 V supplied from the voltage generation circuit 19, and provides the generated power voltage of 8.0 V to the corresponding device (not shown).

A supply voltage controller circuit 22 (which may also be referred to as a supply voltage controller) is provided as hardware (i.e., hardware circuitry) between the main microcomputer 2 and the map information drawing device 12. Specifically, the supply voltage controller circuit 22 includes (i) a buffer circuit 23 provided between the main microcomputer 2 and the map information drawing device 12 and (ii) a pull-up resistor 26 that pulls up the signal line 25 on the output side of the buffer circuit 23 to the voltage generation circuit 20. The signal line 24 on the input side of the buffer circuit 23 is connected to the main microcomputer 2. The signal line 25 on the output side of the buffer circuit 23 is connected to the map information drawing device 12. The buffer circuit 23 includes a buffer IC 27 and an NPN type transistor 28. The output terminal of the buffer IC 27 is connected to the base terminal of the transistor 28. The collector terminal of the transistor 28 is connected to the map information drawing device 12 and the pull-up resistor 26 via the signal line 25 on the output side. The emitter terminal of the transistor 28 is grounded. That is, the buffer circuit 23 electrically separates the functional block of the safety and security power and the functional block of the multimedia power by the transistor 28.

Next, an operation of the above described configuration will be described with reference to FIGS. 4 and 5. First suppose a state where a power voltage of 10 V or higher is normally supplied to the vehicular control apparatus 1, and both the functional block of the safety and security power and the functional block of the multimedia power are operating normally. In such a state, in the map information drawing device 12, the supply voltage of the device power satisfies the condition equal to or higher than the input voltage of the signal line.

When the voltage detector circuit 4 detects that the power voltage supplied to the vehicular control apparatus 1 from the outside has dropped from 10 V or more to 4 V, the voltage detector circuit 4 notifies the sub-microcomputer 3 of the voltage drop detection. When the voltage detector circuit 4 notifies of the voltage drop detection, the sub-microcomputer 3 notifies the voltage generation circuit 19 of a power supply stop command. When the voltage detector circuit 4 notifies of the power supply stop command, the voltage generation circuit 19 stops the supply of the power voltage of 7.0 V. That is, the voltage supplied from the voltage generation circuit 19 is unstable, the voltage supplied from the voltage generation circuit 20 is also unstable, and the supply voltage of the device power is also unstable. As a result, the map information drawing device 12 changes from the normal operating state to the unstable state (t1 in FIG. 4 and t11 in FIG. 5).

In this state, the functional block of the multimedia power stops operating, but the functional block of the safe and secure power continues to operate. Therefore, a power voltage of 3.3 V is applied to the signal line 24 on the input side of the buffer circuit 23. On the other hand, when the functional block of the multimedia power stops operating, the power voltage pulled up by the pull-up resistor 26 drops concurrently. The power voltage of 3.3 V is thus not applied to the signal line 25 on the output side of the buffer circuit 23. As a result, in the map information drawing device 12, the supply voltage of the device power continues to satisfy the condition equal to or higher than the input voltage of the signal line.

After that, the output voltage of the control signal from the main microcomputer 2 is temporarily turned off in order to restart the map information drawing device 12 in the unstable state. In this case, the time at which the output voltage of the control signal from the main microcomputer 2 is turned off does not depend on the time at which the power voltage supplied from the outside to the vehicular control apparatus 1 recovers.

Figure 4:
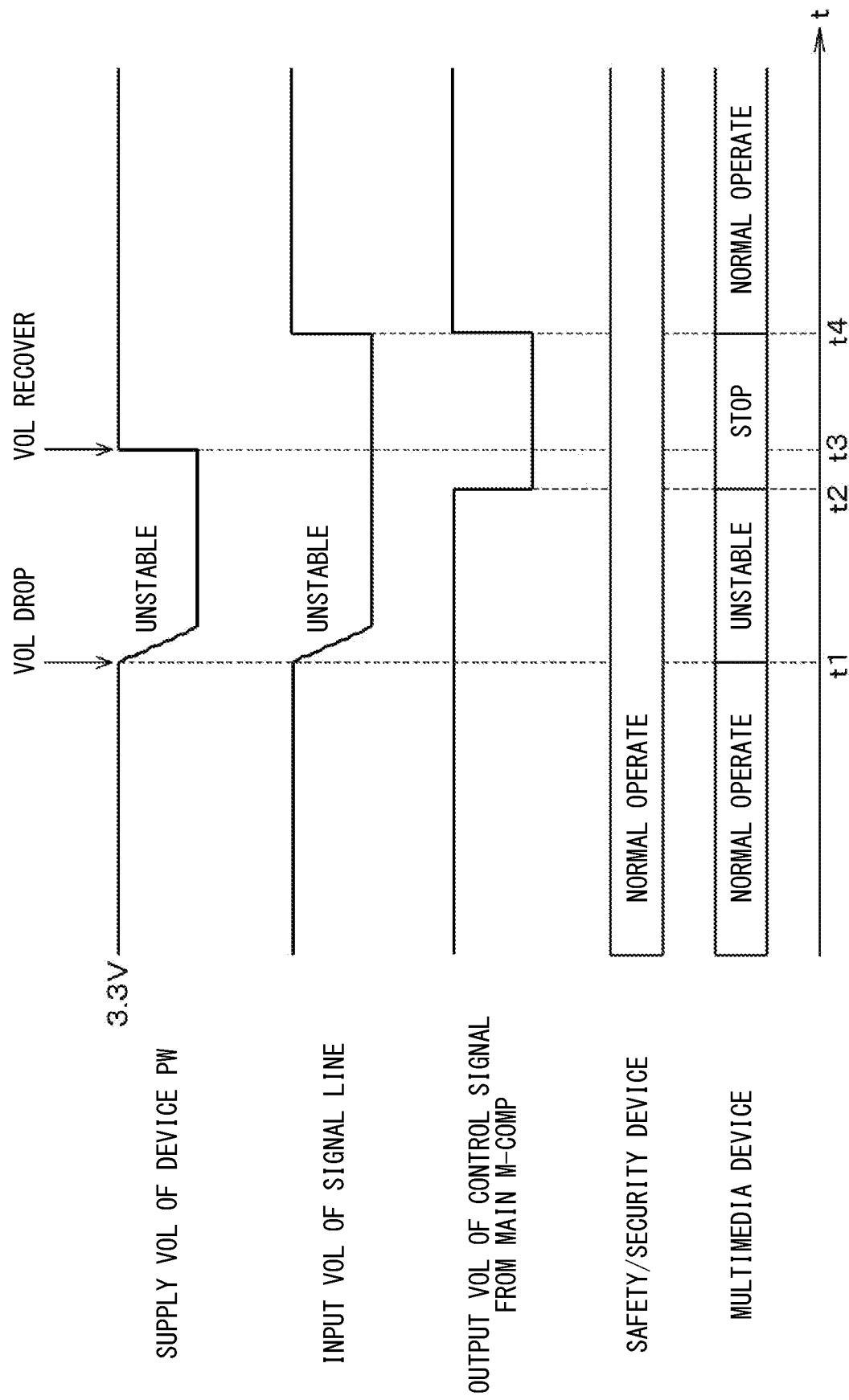
FIG. 4 is a timing chart (No. 1)

FIG. 4 will be referred to for describing a case where the output voltage of the control signal from the main microcomputer 2 is temporarily turned off before the power voltage supplied to the vehicular control apparatus 1 from the outside returns from 4 V to 10 V or more. If the output voltage of the control signal from the main microcomputer 2 is once turned off before the power voltage recovers from 4 V to 10 V or more, the map information drawing device 12 moves from an unstable state to a stopped state (t2 in FIG. 4). When the voltage detector circuit 4 detects that the power voltage supplied to the vehicular control apparatus 1 from the outside has recovered from 4 V to 10 V or more, the voltage detector circuit 4 notifies the sub-microcomputer 3 of the voltage recovery detection. When the voltage recovery detection is notified from the voltage detector circuit 4, the sub-microcomputer 3 notifies the voltage generation circuit 19 of a power supply start command. When the voltage detector circuit 4 notifies the power supply start command, the voltage generation circuit 19 starts supplying the power voltage of 7.0 V. That is, the voltage supplied from the voltage generation circuit 19 is 7.0 V, the voltage supplied from the voltage generation circuit 20 is 3.3 V, and the supply voltage of the device power is 3.3 V (t3 in FIG. 4). After that, when the output voltage of the control signal from the main microcomputer 2 is turned on, the input voltage of the signal line recovers, and the map information drawing device 12 recovers from the stopped state to the normal operating state (t4 in FIG. 4).

Figure 5:
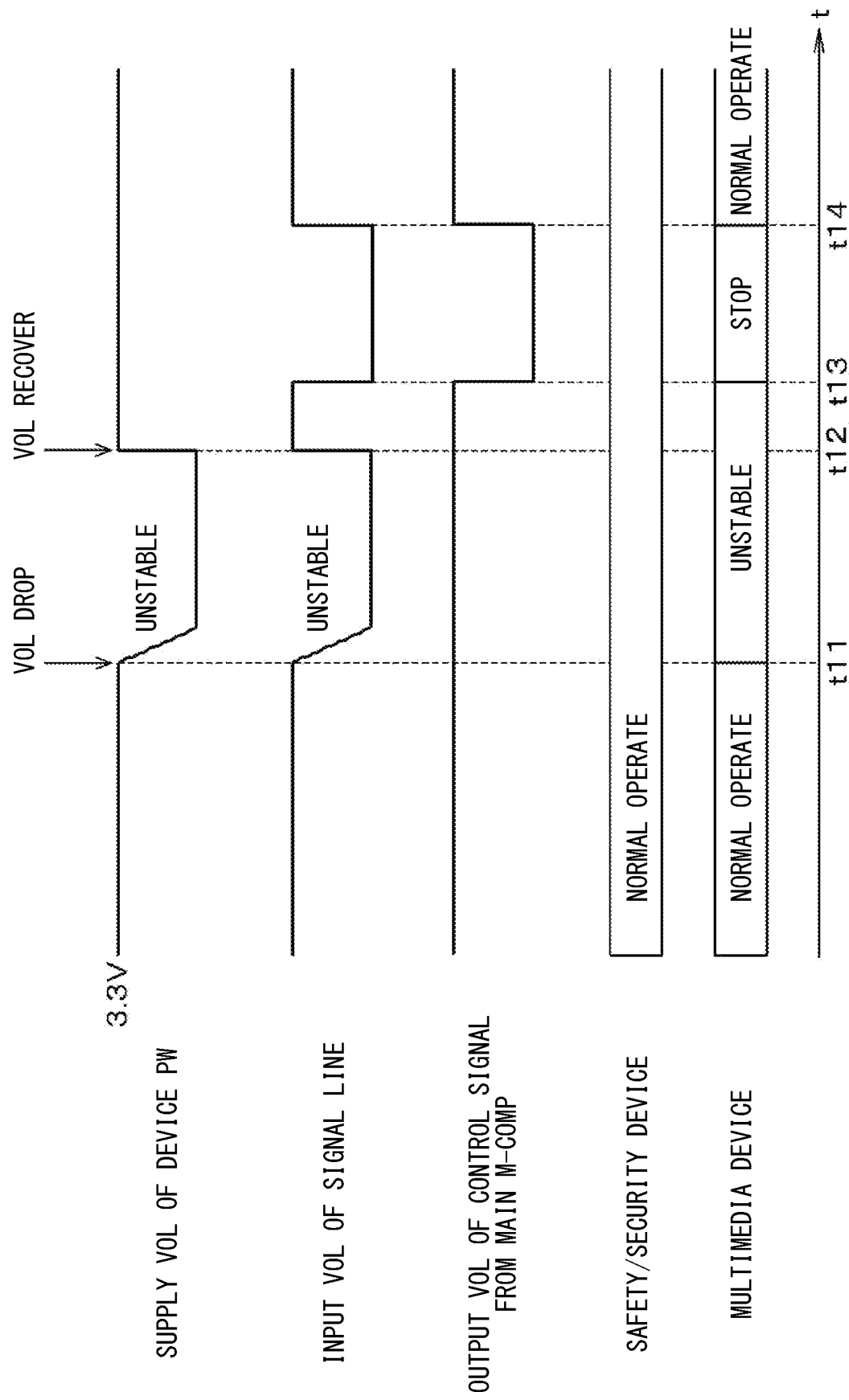
FIG. 5 is a timing chart (No. 2)

On the other hand, FIG. 5 will be referred to for describing a case where the output voltage of the control signal from the main microcomputer 2 is temporarily turned off after the power voltage supplied to the vehicular control apparatus 1 from the outside recovers from 4 V to 10 V. When the voltage detector circuit 4 detects that the power voltage supplied to the vehicular control apparatus 1 from the outside has recovered from 4 V to 10 V or more, the voltage detector circuit 4 notifies the sub-microcomputer 3 of the voltage recovery detection. When the voltage recovery detection is notified from the voltage detector circuit 4, the sub-microcomputer 3 notifies the voltage generation circuit 19 of a power supply start command. When the voltage detector circuit 4 notifies the power supply start command, the voltage generation circuit 19 starts supplying the power voltage of 7.0 V. That is, the voltage supplied from the voltage generation circuit 19 is 7.0 V, the voltage supplied from the voltage generation circuit 20 is 3.3 V, and the supply voltage of the device power is 3.3 V (t12 in FIG. 5). Once the output voltage of the control signal from the main microcomputer 2 is turned off, the input voltage of the signal line drops, and the map information drawing device 12 moves from an unstable state to a stopped state (t13 in FIG. 5). After that, when the output voltage of the control signal from the main microcomputer 2 is turned on, the input voltage of the signal line recovers, and the map information drawing device 12 recovers from the stopped state to the normal operating state (t14 in FIG. 5).

Figure 6:
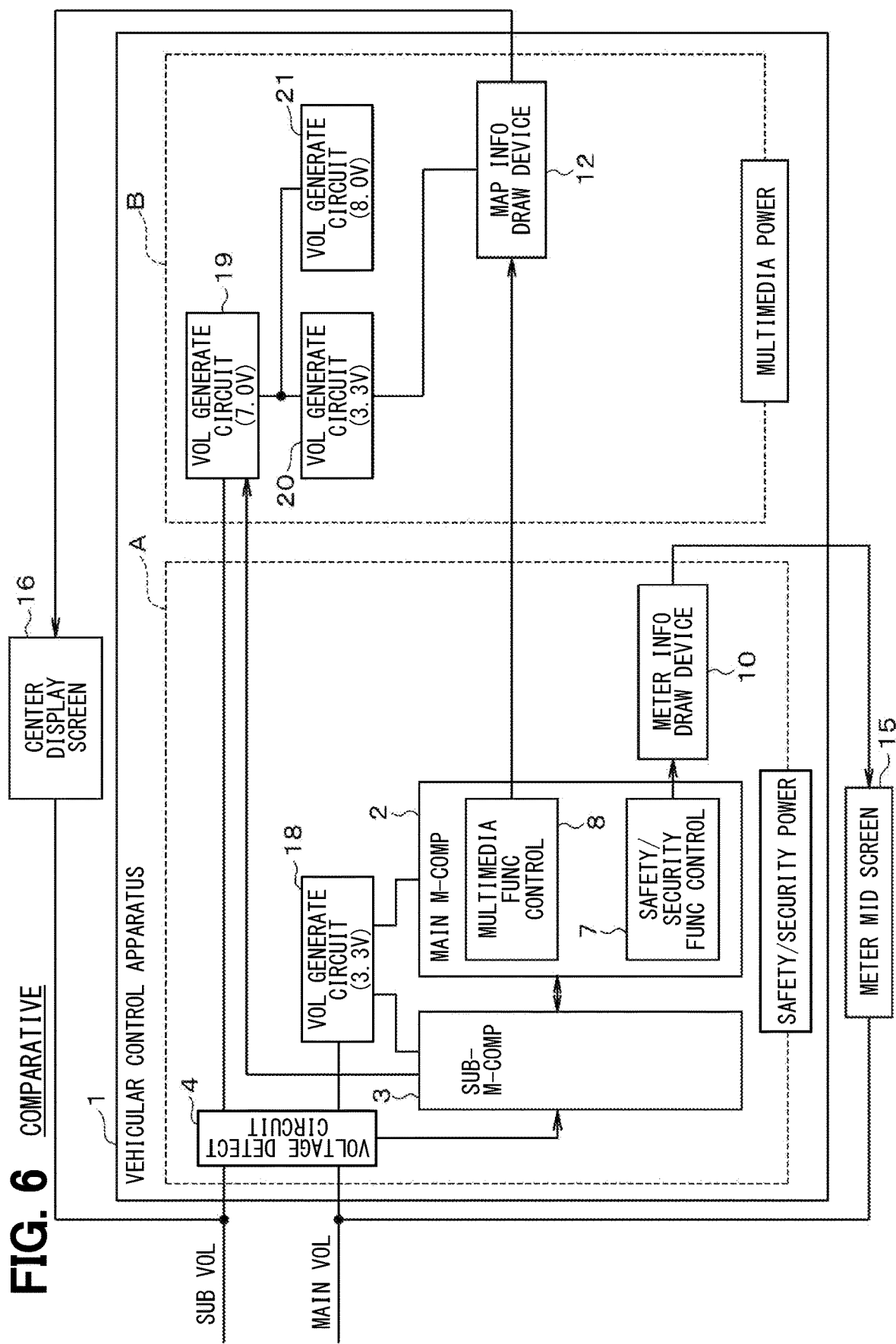
FIG. 6 is a functional block diagram showing a configuration of a comparative example.

Under the configuration shown in FIG. 6 in which the supply voltage controller circuit 22 is not provided, suppose a case that the power voltage supplied from the outside to the vehicular control apparatus 1 drops from 10 V or more to 4 V. In such a case, in the map information drawing device 12, the supply of the device power is stopped before the input of the control signal from the main microcomputer 2 is stopped. As a result, the supply voltage of the device power may be lower than the input voltage of the signal line, and there is a concern that the device may be destroyed. On the other hand, in the present embodiment, the supply voltage controller circuit 22 is provided so as to prevent an occurrence of a situation where the supply of the device power is stopped before the input of the control signal from the main microcomputer 2 is stopped. Preventing an occurrence of the above situation can prevent an occurrence of a situation where the supply voltage of the device power becomes less than the input voltage of the signal line.

The first embodiment enables the following. The dropping of the power voltage supplied from the outside causes a situation. That is, the supply voltage of the device power supplied to the multimedia device 6 thereby becomes less than the voltage of the signal line 24 of the control signal transmitted from the main microcomputer 2 to the multimedia device 6. In the first embodiment, the vehicular control apparatus 1 is provided with a supply voltage controller circuit 22 that is provided between the main microcomputer 2 and the multimedia device 6. Providing such a supply voltage controller circuit 22 can prevent an occurrence of the above situation. As a result, software control is not adopted as a countermeasure against device destruction but hardware (i.e., circuitry) is added. This enables the device destruction to be prevented from occurring when the power voltage supplied from the outside drops.

Further, the supply voltage controller circuit 22 includes the buffer circuit 23 and the pull-up resistor 26. This can be realized by a simple circuit using the buffer circuit 23 and the pull-up resistor 26.

Second Embodiment

A second embodiment will be described with reference to FIG. 7. Hereinafter, the description of the same parts as those in the first embodiment will be omitted, and only different parts will be described. The second embodiment is a configuration in which the buffer circuit 23 described in the first embodiment is incorporated in the main microcomputer.

Figure 7:
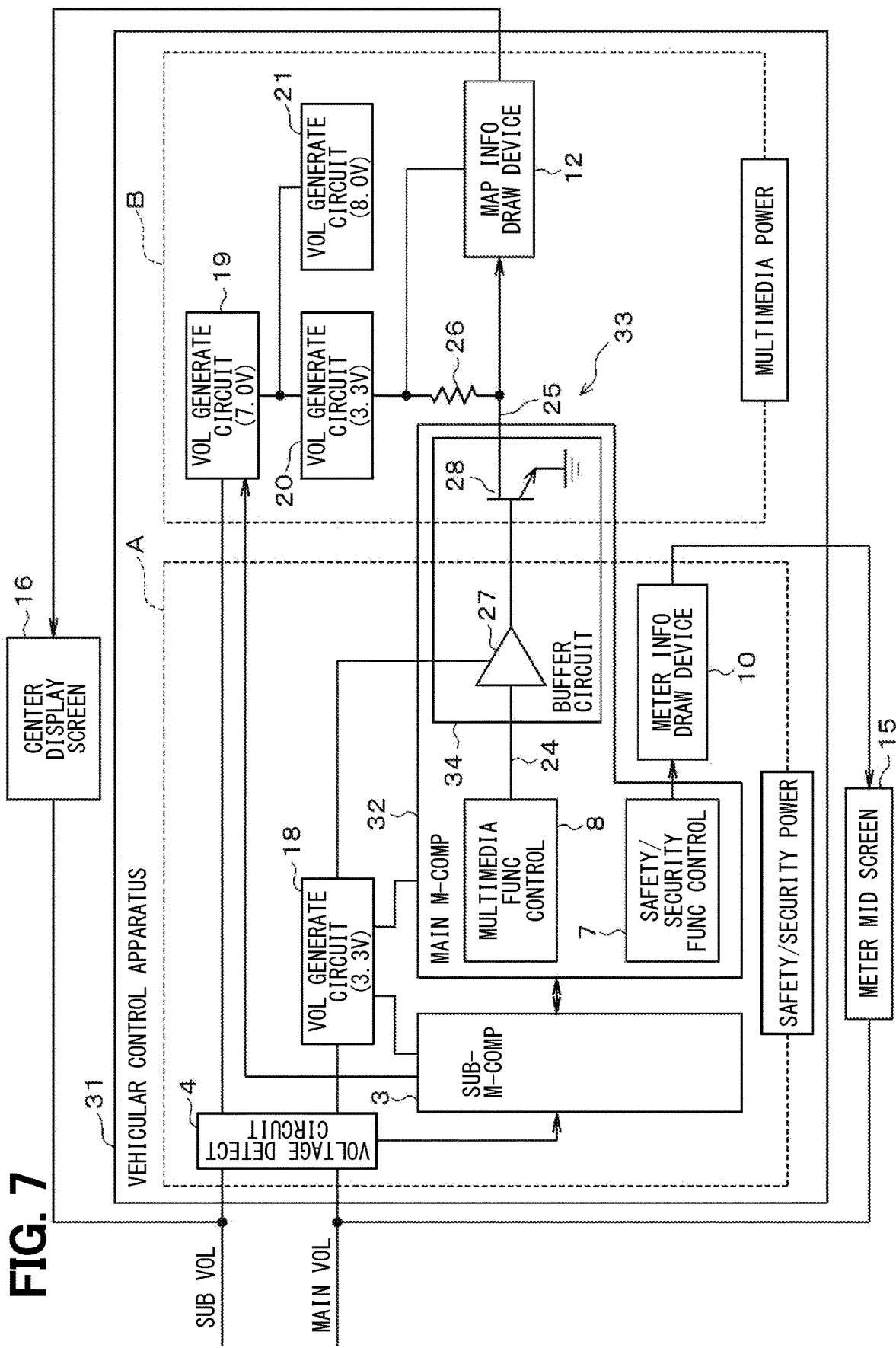
FIG. 7 is a functional block diagram showing a main part according to a second embodiment.

As shown in FIG. 7, in the vehicular control apparatus 31, the main microcomputer 32 incorporates a part of the supply voltage controller circuit 33 (supply voltage controller). Unlike the microcomputer 2 described in the first embodiment, the main microcomputer 32 includes a safety and security function controller 7, a multimedia function controller 8, and a buffer circuit 34. The buffer circuit 34 includes the buffer IC 27 and the transistor 28, as described in the first embodiment, and has the same function as the buffer circuit 23 described in the first embodiment.

According to the second embodiment, even in a configuration in which the buffer circuit 23 is incorporated in the main microcomputer 32, the same effects as those in the first embodiment described above can be obtained. Further, since the buffer circuit 34 is incorporated in the main microcomputer 32, the number of parts and the board space can be reduced, and the device can be miniaturized.

Third Embodiment

A third embodiment will be described with reference to FIG. 8. Hereinafter, the description of the same parts as those in the first embodiment will be omitted, and only different parts will be described. The third embodiment has a configuration in which a level shifter circuit is adopted in place of the buffer circuit 23 and the pull-up resistor 26 described in the first embodiment.

Figure 8:
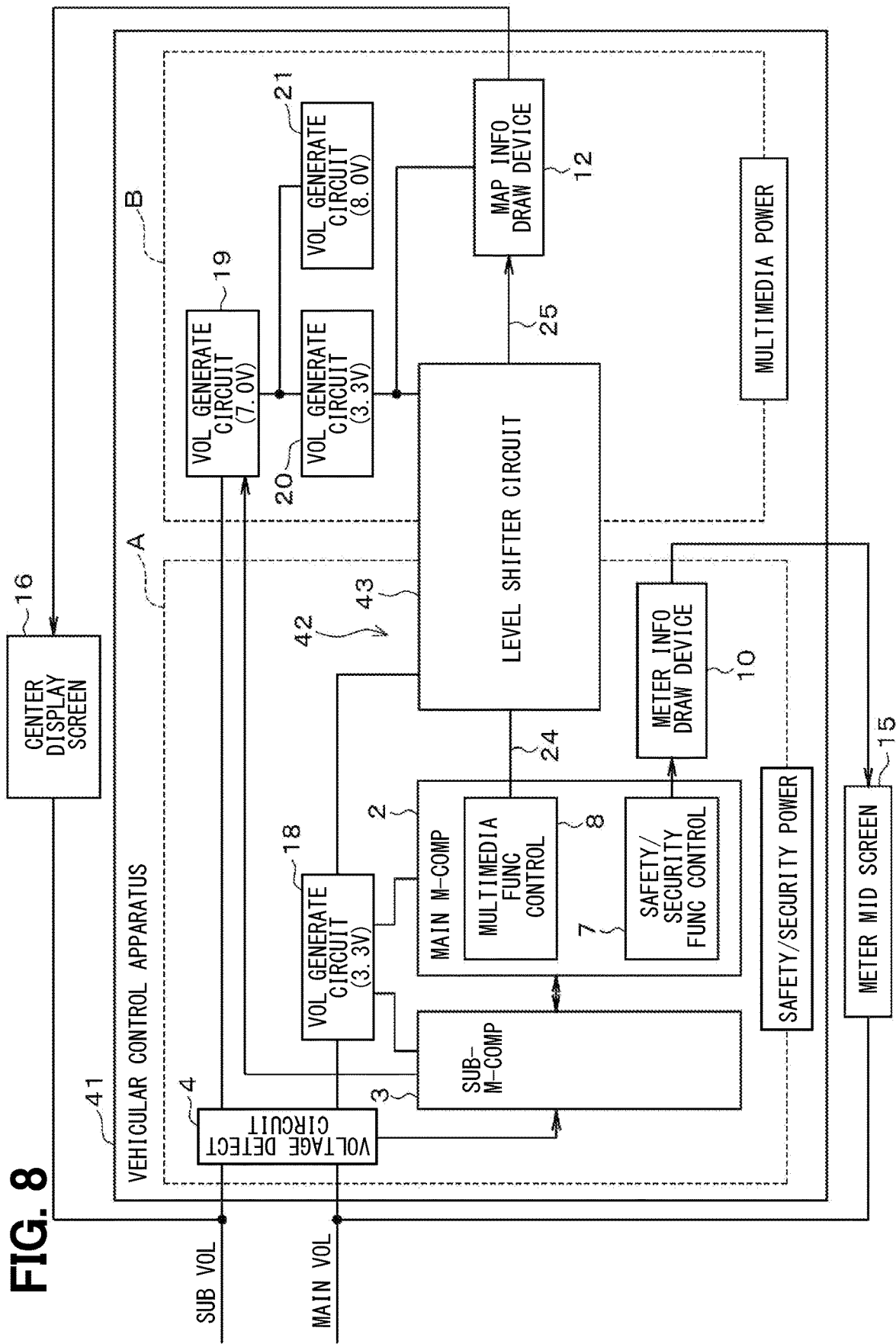
FIG. 8 is a functional block diagram showing a main part according to a third embodiment.

As shown in FIG. 8, in the vehicular control apparatus 41, a level shifter circuit 43 is provided as a supply voltage controller circuit 42 between the main microcomputer 2 and the multimedia device 6. The level shifter circuit 43 converts the output voltage output to the signal line 25 from 3.3 V to 0 V when the voltage supplied from the voltage generation circuit 19 becomes unstable and the voltage supplied from the voltage generation circuit 20 becomes unstable. By providing the level shifter circuit 43, it is possible to avoid a situation in which the supply of the device power is stopped before the input of the control signal from the main microcomputer 2 is stopped.

According to the third embodiment, even in a configuration in which the level shifter circuit 43 is provided as the supply voltage controller circuit 42, the same effects as those in the first embodiment described above can be obtained.

Fourth Embodiment

A fourth embodiment will be described with reference to FIG. 9. Hereinafter, the description of the same parts as those in the first embodiment will be omitted, and only different parts will be described. The fourth embodiment has a configuration in which the main microcomputer 2 and the external cooperation device 13 communicate with each other via an I2C (Inter-Integrated Circuit). That is, the main microcomputer 2 and the external cooperation device 13 perform data communication via a clock line and a data line.

Figure 9:
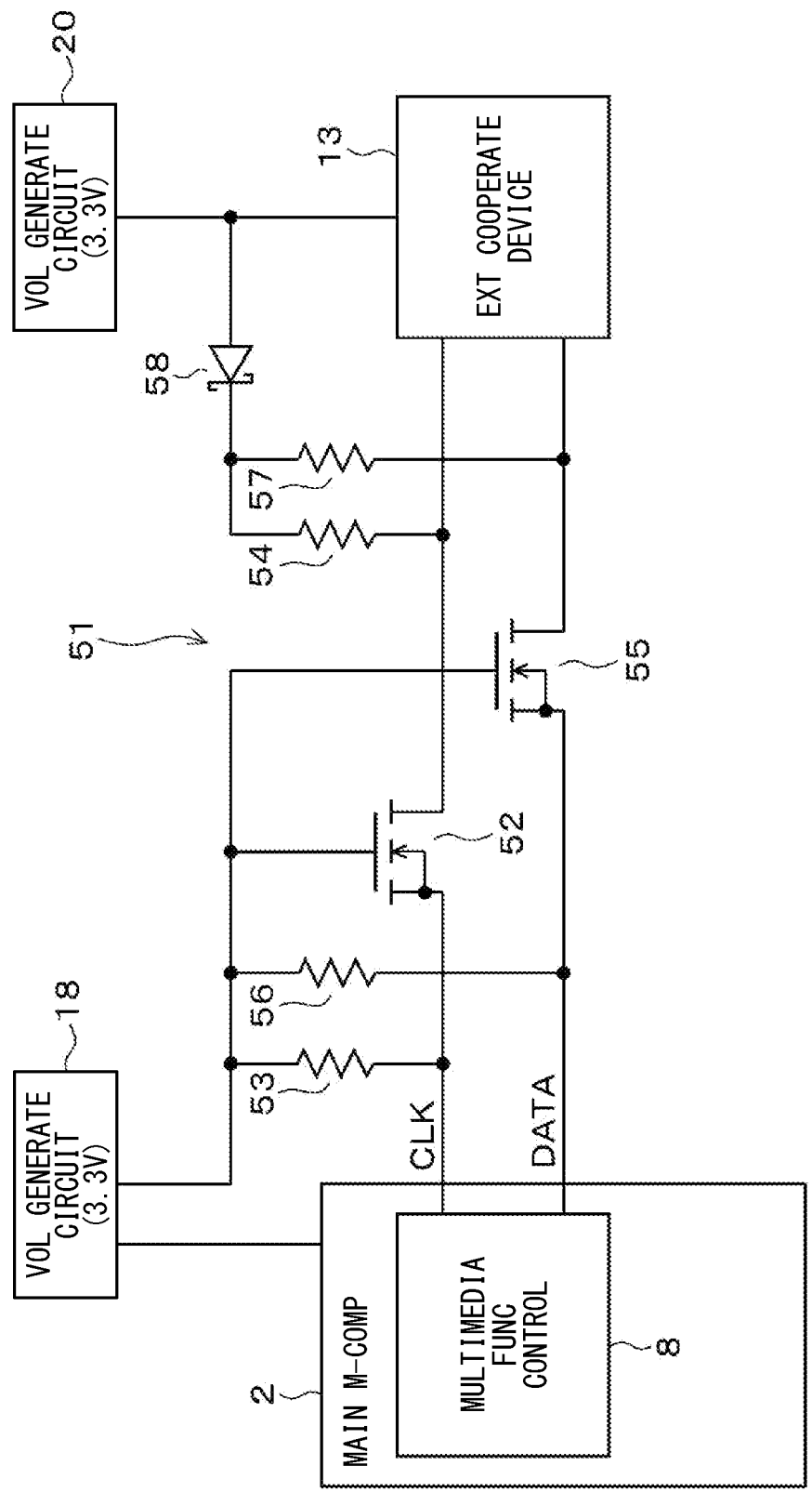
FIG. 9 is a functional block diagram showing a main part according to a fourth embodiment.

As shown in FIG. 9, a supply voltage controller circuit 51 is provided between the main microcomputer 2 and the external cooperation device 13. An N-channel type FET 52 (switching element) is interposed in the clock line connecting the main microcomputer 2 and the external cooperation device 13. The clock line on the main microcomputer 2 side is connected to the source terminal of the N-channel type FET 52 and is also connected to the voltage generation circuit 18 via the pull-up resistor 53. The gate terminal of the N-channel type FET 52 is connected to the voltage generation circuit 18. The drain terminal of the N-channel type FET 52 is connected to the clock line on the external cooperation device 13 side, and is also connected to the voltage generation circuit 20 via the pull-up resistor 54 and the diode 58. An N-channel type FET 55 (switching element) is interposed in the data line connecting the main microcomputer 2 and the external cooperation device 13. The data line on the main microcomputer 2 side is connected to the source terminal of the N-channel type FET 55 and is also connected to the voltage generation circuit 18 via the pull-up resistor 56. The gate terminal of the N-channel type FET 55 is connected to the voltage generation circuit 18. The drain terminal of the N-channel type FET 55 is connected to the data line on the external cooperation device 13 side, and is also connected to the voltage generation circuit 20 via the pull-up resistor 57 and the diode 58. The diode 58 prevents the noise of the clock line from being input to the voltage generation circuit 20.

According to the fourth embodiment, even in a configuration in which the main microcomputer 2 and the external cooperation device 13 perform the I2C communication, the same effects as those in the first embodiment described above can be obtained.

Other Embodiments

Although the present disclosure has been described in accordance with the examples, it is understood that the present disclosure is not limited to such examples or structures. The present disclosure encompasses various modifications and variations within the scope of equivalents. Additionally, various combinations and configurations, as well as other combinations and configurations including more, less, or only a single element, are within the scope and spirit of the present disclosure. The first characteristic device is not limited to the safety and security device that provides the safety and security function, and may be a device that provides other functions. The second characteristic device is not limited to the multimedia device that provides the multimedia function, and may be a device that provides other functions.

The controller and the method thereof described in the present disclosure may be implemented (i) by (a) a first special-purpose computer provided by configuring a processor and a memory programmed to execute one or more functions embodied by a computer program product, or (ii) by (b) a second special-purpose computer provided by configuring a processor with one or more special-purpose hardware logic circuits, or (iii) any combination of (a) the first special-purpose computer provided by configuring the processor and the memory and (b) the second special-purpose computer provided by configuring the processor with one or more special-purpose hardware logic circuits. The computer program may also be stored on a computer readable non-transitory tangible storage medium as instructions to be executed by a computer.

For reference to further explain features of the present disclosure, the description is added as follows.

For example, a vehicle such as an automobile is equipped with a vehicular control apparatus that integrally controls a plurality of functions having different characteristics. Such a vehicular control apparatus may have a configuration which includes (i) a first characteristic device that provides the function of a first characteristic, (ii) a second characteristic device that provides the function of a second characteristic, and (iii) a microcomputer that controls the function of the first characteristic and the function of the second characteristic. Further, in such a configuration, the function of the first characteristic may be a function that requires operation guarantee at low voltage, and the function of the second characteristic may be a function that does not require operation guarantee at low voltage. In such a case, the microcomputer and the first characteristic device may be operated by a first power that provides the operation guarantee at the low voltage, whereas the second characteristic device may be operated by a second power that does not provide the operation guarantee at the low voltage. The first characteristic device may be a safety and security device that provides a safety and security function that requires safety and security rather than convenience and comfort. The second characteristic device may be a multimedia device that provides a multimedia function that does not require as much safety and security as the safety and security function.

Start operation for starting the engine of the vehicle needs high electric power; this involves a momentary interruption which reduces temporarily the power voltage supplied to the vehicular control apparatus from the outside. The above configuration in which the microcomputer controls a plurality of types of functions having different power restrictions needs to continue some functions even if a momentary interruption occurs. For example, suppose a case where the power voltage drops from 10 V or higher to 4 V. Under such a case, at 10 V or higher both the safety and security function and the multimedia function are operated normally, whereas at 4 V, the multimedia function needs to be stopped, but the safety and security function needs to be continued.

The procedure for stopping the multimedia function may be executed by the microcomputer stopping the output of the control signal to the multimedia device when it detects a drop in the power voltage supplied from the outside. Concurrently the supply of device power to the multimedia device is stopped due to the drop in power voltage. In this case, in the multimedia device, the supply of the device power is assumed to be stopped before the input of the control signal from the microcomputer is stopped. Under such assumption, the voltage is still applied to the signal line under the state where the device power is not supplied. As a result, the supply voltage of the device power may be lower than the input voltage of the signal line, and there is a concern that the device may be destroyed.

As a countermeasure for such a situation, it is conceivable to adopt software control when an abnormality occurs.

As a countermeasure against device destruction when the power voltage drops, a configuration may be conceivable in which the microcomputer detects the drop in the power voltage and stops the output of the control signal to the multimedia device as described above. However, in this configuration, even if the interrupt processing is executed in the microcomputer immediately after the decrease in the power voltage is detected, the control signal may be output by the processing that has been executed earlier. In that case, it becomes difficult to stop the input of the control signal from the microcomputer before the supply of the device power is stopped, and it becomes difficult to avoid the device destruction.

It is thus desired to appropriately avoid an occurrence of device destruction when the power voltage supplied from the outside drops.

An aspect of the present disclosure described herein is set forth in the following clauses.

According to an aspect of the present disclosure, a vehicular control apparatus is provided to include a first characteristic device, a second characteristic device, a controller, and a supply voltage controller. The first characteristic device is configured to provide a function of a first characteristic. The second characteristic device is configured to provide a function of a second characteristic. The controller is configured to output a control signal to each of the first characteristic device and the second characteristic device via a signal line; and The supply voltage controller is provided between the controller and the second characteristic device. Herein, a minimum operating voltage of the first characteristic device is set to be lower than a minimum operating voltage of the second characteristic device. The supply voltage controller is configured to prevent an occurrence of a situation where a supply voltage of a device power supplied to the second characteristic device becomes less than an input voltage of the signal line of the control signal transmitted from the controller to the second characteristic device.

A supply voltage controller is thereby provided between the controller and the second characteristic device. When the power voltage supplied from the outside drops, the supply voltage controller is provided to prevent an occurrence of a situation in which the supply voltage of the device power supplied to the second characteristic device becomes less than the input voltage of the signal line of the control signal transmitted from the controller to the second characteristic device. As a result, it is possible to appropriately avoid the occurrence of device destruction when the power voltage supplied from the outside drops.

What is claimed is:

1. A vehicular control apparatus, comprising:
   a first characteristic device configured to provide a function of a first characteristic;
   a second characteristic device configured to provide a function of a second characteristic;
   a controller configured to output a control signal to each of the first characteristic device and the second characteristic device via a signal line; and
   a supply voltage controller provided between the controller and the second characteristic device,
   wherein:
   a minimum operating voltage of the first characteristic device is set to be lower than a minimum operating voltage of the second characteristic device;
   the supply voltage controller is configured to prevent an occurrence of a situation where a supply voltage of a device power supplied to the second characteristic device becomes less than an input voltage of the signal line of the control signal transmitted from the controller to the second characteristic device;
   the first characteristic device includes a safety and security device configured to provide, as the function of the first characteristic, a safety and security function that is required to provide safety and security rather than convenience and comfort; and the second characteristic device includes a multimedia device configured to provide, as the function of the second characteristic, a multimedia function that is not required to provide as much safety and security as the safety and security function.

2. The vehicular control apparatus according to claim 1, wherein:

the supply voltage controller includes a level shifter circuit.

3. A vehicular control apparatus, comprising:

a first characteristic device configured to provide a function of a first characteristic;

a second characteristic device configured to provide a function of a second characteristic;

a controller configured to output a control signal to each of the first characteristic device and the second characteristic device via a signal line; and a supply voltage controller provided between the controller and the second characteristic device, wherein:

a minimum operating voltage of the first characteristic device is set to be lower than a minimum operating voltage of the second characteristic device;

the supply voltage controller is configured to prevent an occurrence of a situation where a supply voltage of a device power supplied to the second characteristic device becomes less than an input voltage of the signal line of the control signal transmitted from the controller to the second characteristic device; and the supply voltage controller includes a buffer circuit and a pull-up resistor.

4. The vehicular control apparatus according to claim 3, wherein:

the buffer circuit is incorporated in the controller.

5. A vehicular control apparatus, comprising:

a first characteristic device configured to provide a function of a first characteristic;

a second characteristic device configured to provide a function of a second characteristic;

a controller configured to output a control signal to each of the first characteristic device and the second characteristic device via a signal line; and a supply voltage controller provided between the controller and the second characteristic device, wherein:

a minimum operating voltage of the first characteristic device is set to be lower than a minimum operating voltage of the second characteristic device;

the supply voltage controller is configured to prevent an occurrence of a situation where a supply voltage of a device power supplied to the second characteristic device becomes less than an input voltage of the signal line of the control signal transmitted from the controller to the second characteristic device;

the controller and the second characteristic device are configured to perform data communication via a clock line and a data line; and the supply voltage controller includes (i) a switching element and a pull-up resistor, which are connected to the clock line, and (ii) a switching element and a pull-up resistor, which are connected to the data line.

* * * * *